(12) United States Patent
Mishima et al.

(10) Patent No.: US 7,507,457 B2
(45) Date of Patent: Mar. 24, 2009

(54) OPTICAL RECORDING MEDIUM AND METHOD OF MANUFACTURING THE SAME

(75) Inventors: Koji Mishima, Tokyo (JP); Daisuke Yoshitoku, Tokyo (JP); Kenji Yamaga, Tokyo (JP)

(73) Assignee: TDK Corporation, Tokyo (JP)

( * ) Notice: Subject to any disclaimer, the term of this patent is extended or adjusted under 35 U.S.C. 154(b) by 554 days.

(21) Appl. No.: 11/140,928

(22) Filed: Jun. 1, 2005

(65) Prior Publication Data

US 2005/0271853 A1 Dec. 8, 2005

(30) Foreign Application Priority Data

Jun. 1, 2004 (JP) .............................. 2004-163239

(51) Int. Cl.
*B32B 3/02* (2006.01)
(52) U.S. Cl. ................. 428/64.1; 428/64.4; 430/270.11
(58) Field of Classification Search ................ 428/64.1, 428/64.4; 430/270.11
See application file for complete search history.

(56) References Cited

U.S. PATENT DOCUMENTS 7,018,697 B2 * 3/2006 Komaki et al. ............. 428/64.1
7,125,593 B2 * 10/2006 Komaki et al. ............. 428/64.1

FOREIGN PATENT DOCUMENTS

| JP | 8-235638 | 9/1996 |
|----|----------|--------|
| JP | 2000-11453 | 1/2000 |
| JP | 2003-242677 | 8/2003 |
| JP | 2004-511061 | 4/2004 |

* cited by examiner

*Primary Examiner*—Elizabeth Mulvaney
(74) *Attorney, Agent, or Firm*—Oblon, Spivak, McClelland, Maier & Neustadt, P.C.

(57) ABSTRACT

An optical recording medium includes a support substrate, and a light transmission layer 12 that is disposed so as to come in contact with the support substrate. At least one of a refractive index of the support substrate and a refractive index of the light transmission layer, and an extinction coefficient of the support substrate and an extinction coefficient of the light transmission layer is different. As such, according to the invention, a reflective layer is not formed between the support substrate and the light transmission layer, such that the support substrate and the light transmission layer directly come in contact with each other. Accordingly, since at least one of the refractive index and the extinction coefficient is different, reflection occurs at the interface between the support substrate and the light transmission layer. Therefore, data held by a plurality of pits, that are arranged on the support substrate in a spiral shape or a concentric shape, can be correctly read out.

9 Claims, 2 Drawing Sheets

OPTICAL RECORDING MEDIUM AND METHOD OF MANUFACTURING THE SAME

BACKGROUND OF THE INVENTION

The present invention relates to an optical recording medium and a method of manufacturing the same. More particularly, the invention relates to a read only optical recording medium and a method of manufacturing the same.

Conventionally, optical recording mediums, such as the CD or DVD, have been widely used as recording mediums for recording digital data. The optical recording mediums can be broadly divided into ROM type optical recording mediums, such as the CD-ROM and DVD-ROM, that do not enable writing and rewriting of data, write-once type optical recording mediums, such as the CD-R and DVD-R, that enable writing but not rewriting of data, and data rewritable type optical recording mediums, such as the CD-RW and DVD-RW, that enable rewriting of data.

Among these, the ROM type optical recording medium includes a support substrate that has a pit column formed during a manufacturing process, and a reflective layer that covers the pit column. In the ROM type optical recording medium, information held by the pit column can be reproduced by irradiating a laser beam onto the reflective layer from the support substrate or an opposite side to the support substrate. An optical recording medium of this type, in which the laser beam is irradiated from the support substrate, can include a so-called CD type optical recording medium or a DVD type optical recording medium. In this case, the support substrate is generally called 'light transmission substrate'. A thickness of the support substrate is set to about 1.1 mm in the CD type optical recording medium and to about 0.6 mm in the DVD type optical recording medium. Furthermore, a protective layer is disposed at an opposite side to the light transmission substrate as viewed from the reflective layer. The DVD type optical recording medium further includes a bonding layer and a dummy substrate having a thickness of about 0.6 mm, in addition to the protective layer.

Meanwhile, a so-called next-generation type optical recording medium, in which a laser beam in the blue wavelength region is used, is an optical recording medium in which a laser beam is irradiated from an opposite side from the support substrate. A light transmission layer, which serves as an optical path of the laser beam, is disposed at an opposite side to the support substrate as viewed from the reflective layer (see JP-A No. 2000-11453). In this case, a thickness of the support substrate is set to about 1.1 mm, and a thickness of the light transmission layer is set to about 0.1 mm.

As such, in the read only optical recording medium according to the related art, the reflective layer needs to be provided on the support substrate. This requires a vacuum process using a sputtering device during the manufacturing process. However, the vacuum process generally is high in manufacturing cost, but relatively low in production efficiency. Therefore, in order to reduce the manufacturing cost and to enhance the production efficiency, it is preferable that the read only optical recording medium is manufactured, without using the vacuum process.

SUMMARY OF THE INVENTION

Accordingly, it is an object of the invention to provide an optical recording medium that can be manufactured, without using a vacuum process by means of a sputtering apparatus or the like, and to a method of manufacturing an optical recording medium.

According to an aspect of the invention, an optical recording medium includes a support substrate, and a light transmission layer that is disposed so as to come in contact with the support substrate. In this case, at least one of a refractive index of the support substrate and a refractive index of the light transmission layer, and an extinction coefficient of the support substrate and an extinction coefficient of the light transmission layer is different. Furthermore, according to another aspect of the invention, a method of manufacturing an optical recording medium includes producing a support substrate by means of an injection molding method, and directly forming a light transmission layer, of which at least one of a refractive index and the extinction coefficient is different from that of the support substrate, on a surface of the support substrate by means of a spin coating method.

As such, according to the invention, although the support substrate and the light transmission layer directly come in contact with each other and the reflective layer is not formed between the support substrate and the light transmission layer, reflection occurs at the interface between the support substrate and the light transmission layer, since at least one of the refractive index and the extinction coefficient is different. Therefore, data held by a plurality of pits, that are arranged on the support substrate in a spiral shape or a concentric shape can be correctly read out.

Both the refractive index of the support substrate and the refractive index of the light transmission layer, and the extinction coefficient of the support substrate and the extinction coefficient of the light transmission layer may be different. This allows the reflection at the interface to be increased.

Furthermore, when the reflectance of about 3% is required, like the next-generation type optical recording medium in which a laser beam of the blue wavelength region is used, assuming that the refractive index of the support substrate and the refractive index of the light transmission layer with respect to light having a wavelength of 405 nm are $n_{11}$ and $n_{12}$, respectively, and a difference between the extinction coefficient of the support substrate and the extinction coefficient of the light transmission layer with respect to light having a wavelength of 405 nm is k, the refractive indexes and the extinction coefficients may be set to satisfy the following equation:

$$0.03 \le \frac{((n_{11} - n_{12})^2 + k^2)}{((n_{11} + n_{12})^2 + k^2))} \qquad \text{[Equation 1]}$$

As described above, according to the invention, an optical recording medium can be manufactured without using a vacuum process with a sputtering apparatus, or the like. Therefore, the manufacturing cost can be drastically reduced and the production efficiency can be significantly increased.

DETAILED DESCRIPTION OF THE PREFERRED EMBODIMENTS

Hereinafter, a preferred embodiment of the invention will be described in detail with reference to the accompanying drawings.

Figure 1:
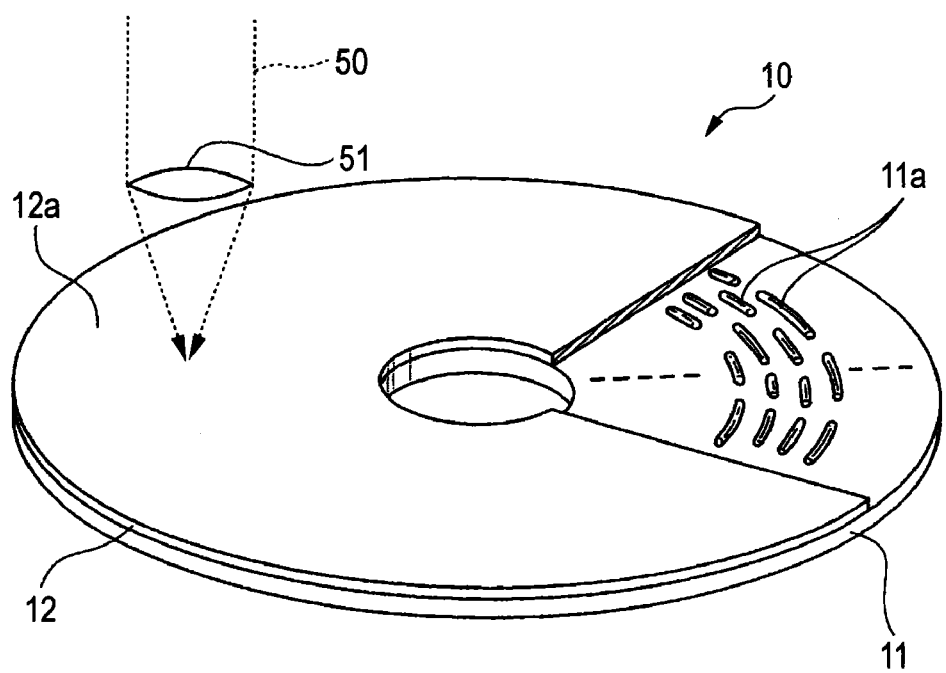
FIG. 1 is a partially cut perspective view schematically showing an appearance of an optical recording medium 10 according to a preferred embodiment of the invention.

FIG. 1 is a partially cut perspective view schematically showing the appearance of an optical recording medium 10 according to a preferred embodiment of the invention.

The optical recording medium 10 according to the present embodiment is a disc-like optical recording medium having an outer diameter of about 120 mm and a thickness of about 1.2 mm. As shown in FIG. 1, the optical recording medium 10 includes a support substrate 11, and a light transmission layer 12 that is disposed so as to come in contact with the support substrate 11. That is, other layer, such as a reflective layer, is not formed between the support substrate 11 and the light transmission layer 12, such that the light transmission layer 12 is formed directly on the support substrate 11.

The optical recording medium 10 according to the present embodiment is a read only (a ROM type) optical recording medium, in which data can be read out by irradiating a laser beam 50 having a wavelength λ ranging from 380 nm to 450 nm, preferably about 405 nm, from a light incident side 12a, which is a surface of the light transmission layer 12. When reproducing data from the optical recording medium 10, an objective lens 51 having the numerical aperture of 0.7 or more, preferably about 0.85, is used. Accordingly, assuming that a wavelength of the laser beam 50 is λ and the numerical aperture of the objective lens 51 is NA, the condition λ/NA≦640 nm is satisfied.

The support substrate 11 is a disc-like substrate having a thickness of about 1.1 mm, which is used to secure a thickness (about 1.2 mm) required for the optical recording medium 10. The support substrate 11 has a plurality of pits 11a that are formed on one surface thereof in a spiral shape or concentric shape from a central portion toward an outer edge portion or from the outer edge portion toward the central portion so as to represent contents of data.

The support substrate 11 is preferably produced using an injection molding method with a stamper, but may be produced using other methods such as a photopolymer (2P) method.

The light transmission layer 12 is a layer that constitutes an incident side of the laser beam 50 and serves as an optical path of the laser beam 50. The light transmission layer 12 is directly formed on a surface, where the pits 11a are formed, among the surfaces of the support substrate 11. Though not particularly limited, a thickness of the light transmission layer 12 is preferably set in a range of from 10 to 300 μm, preferably in a range of from 50 to 150 μm.

In this case, assuming that a refractive index of a material constituting the support substrate 11 is $n_{11}$ and an extinction coefficient thereof is $k_{11}$, and a refractive index of a material constituting the light transmission layer 12 is $n_{12}$ and an extinction coefficient thereof is $k_{12}$, the condition $n_{11} \neq n_{12}$ or $k_{11} \neq k_{12}$ (where $k_{12} \cong 0$). That is, at least one of the refractive index and the extinction coefficient of the support substrate 11 is different from the refractive index or the extinction coefficient of the light transmission layer 12. This allows the reflection to occur at the interface of the support substrate 11 and the light transmission layer 12. A reflective layer is not formed between the support substrate 11 and the light transmission layer 12. Therefore, even though the light transmission layer 12 is directly formed on the support substrate 11, data can be reproduced by reflecting the laser beam 50 to be irradiated when reproducing.

In order to increase the reflection at the interface of the support substrate 11 and the light transmission layer 12, it is preferable that a difference between the refractive index $n_{11}$ and the refractive index $n_{12}$ or a difference between the extinction coefficient $k_{11}$ and the extinction coefficient $k_{12}$ in the wavelength region of the laser beam 50 is as high as possible. Therefore, it is preferable that the conditions $n_{11} \neq n_{12}$ and $k_{11} \neq k_{12}$ (where $k_{12} \cong 0$) are satisfied. That is, it is preferable that both the refractive index and the extinction coefficient of the support substrate 11 are different from those of the light transmission layer 12.

The difference between the refractive index $n_{11}$ and the refractive index $n_{12}$ or the difference between the extinction coefficient $k_{11}$ and the extinction coefficient $k_{12}$ can be set differently according to a required reflectance. For example, in the next-generation type optical recording medium in which the laser beam 50 having a wavelength of about 405 nm is used, data reproduction can be sufficiently performed when the reflectance is 3% or more. Thus, a material may be selected to satisfy this condition.

Figure 2:
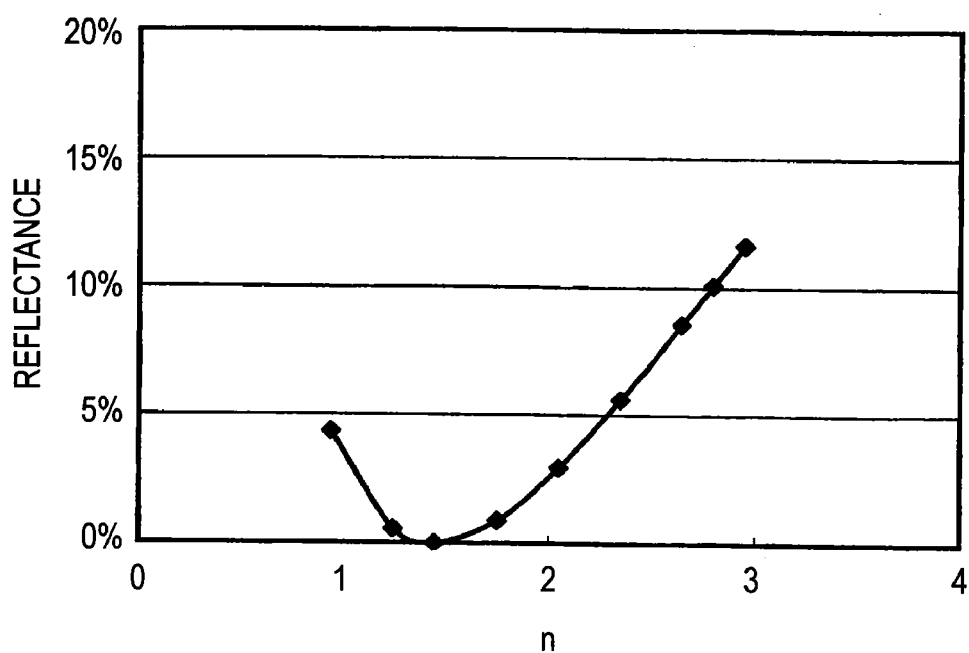
FIG. 2 is a graph showing the relationship of a difference between refractive indexes and reflectance.

FIG. 2 is a graph showing the relationship of the difference between the refractive indexes and the reflectance. Specifically, FIG. 2 is a graph showing the relationship between the refractive index $n_{11}$ of the support substrate 11 and the resultant reflectance, when the refractive index $n_{12}$ of the light transmission layer 12 is 1.45, the extinction coefficient $k_{11}$ of the support substrate 11 and the extinction coefficient $k_{12}$ of the light transmission layer 12 are almost zero, with respect to light having a wavelength of about 405 nm.

Referring to FIG. 2, it can be seen that, when the extinction coefficient $k_{11}$ and $k_{12}$ are the same (=almost zero), the reflectance increases as the difference between the refractive index $n_{11}$ and the refractive index $n_{12}$ increases. In this case, in order to obtain the reflectance of 3% or more, the refractive index $n_{11}$ of the support substrate 11 may be 2.06 or more. Specifically, if the condition $|n_{11}|-|n_{12}| \geq 0.61 (=2.06-1.45)$ is satisfied, the reflectance of 3% or more can be achieved.

Figure 3:
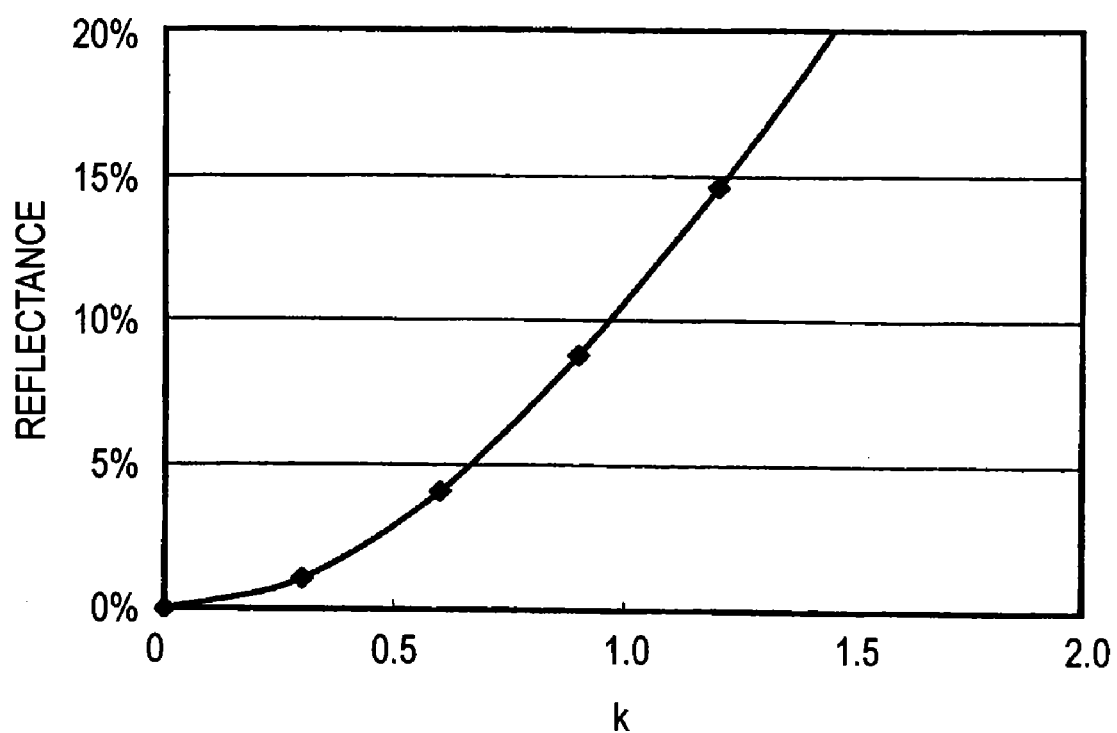
FIG. 3 is a graph showing the relationship of a difference between extinction coefficients and reflectance.

FIG. 3 is a graph showing the relationship of the difference between the extinction coefficients and the reflectance. Specifically, FIG. 3 is a graph showing the relationship between the extinction coefficient $k_{11}$ of the support substrate 11 and the reflectance, when the extinction coefficient $k_{12}$ of the light transmission layer 12 is almost zero and both the refractive index $n_{11}$ of the support substrate 11 and the refractive index $n_{12}$ of the light transmission layer 12 are 1.45, with respect to light having a wavelength of about 405 nm.

Referring to FIG. 3, it can be seen that, when the refractive indexes $n_{11}$ and $n_{12}$ are the same (=1.45), the reflectance increases as the difference between the extinction coefficient $k_{11}$ and the extinction coefficient $k_{12}$ increases. In this case, in order to obtain the reflectance of 3% or more, the extinction coefficient $k_{11}$ of the support substrate 11 may be 0.51 or more. Specifically, if the condition $|k_{11}|-|k_{12}| \geq 0.51$ is satisfied, the reflectance of 3% or more can be obtained.

FIG. 2 corresponds to a case in which the extinction coefficients of the support substrate 11 and the light transmission layer 12 are the same ($k_{11}=k_{12}$), and FIG. 3 corresponds to a case where the refractive indexes of the support substrate 11 and the light transmission layer 12 are the same ($n_{11}=n_{12}$). The relationship between the refractive index or the extinction coefficient and the reflectance can be expressed by the following general equation. That is, assuming that the difference ($=|k_{11}|-|k_{12}|$) between the extinction coefficient $k_{11}$ of the support substrate 11 and the extinction coefficient $k_{12}$ of the light transmission layer 12 is k, the resultant reflectance (ref.) can be expressed by the following equation.

Therefore, in order to obtain reflectance of 3% or more, the refractive indexes and the extinction coefficients may be set, such that the following equation is satisfied:

$$0.03 \leq \frac{((n_{11} - n_{12})^2 + k^2)}{((n_{11} + n_{12})^2 + k^2))} \quad \text{[Equation 3]}$$

$$0.03 \geq \frac{((n_{11} - n_{12})^2 + k^2)}{((n_{11} + n_{12})^2 + k^2))} \quad \text{[Equation 3]}$$

Various materials can be used as a material for the support substrate 11 and the light transmission layer 12, insofar as they satisfy the above-described conditions.

For example, the material of the support substrate 11 can include glass or resin. Among these, resin is preferably used in terms of ease of molding. Resin can include polycarbonate resin, polyolefine resin, acrylic resin, epoxy resin, polystyrene resin, polyethylene resin, polypropylene resin, silicon resin, fluorocarbon resin, acrylonitrile butadiene styrene (ABS) resin, urethane resin, or the like. Among these, in particular, polycarbonate resin or polyolefine resin is most preferably used from the viewpoint of easy processing and the like. The refractive index $n_{11}$ or the extinction coefficient $k_{11}$ can be controlled by adding an inorganic material, such as ceramic or the like, to resin or the like, which is the main ingredient of the support substrate 11. The support substrate 11 does not serve as the optical path of the laser beam 50, and thus does not need to have high light transmission.

On the other hand, the light transmission layer 12 needs to be made of a material having sufficiently high transmittance in the wavelength region of the laser beam 50. For example, the material can include acryl- or epoxy-based ultraviolet curable resin. Furthermore, instead of a film that is formed by curing ultraviolet curable resin, the light transmission layer 12 can be formed by using a light transmission sheet made of light transmission resin and various bonding agents or adhesives. The refractive index $n_{12}$ of the light transmission layer 12 can also be adjusted by adding an inorganic material, such as ceramic or the like, to resin or the like serving as the main ingredient.

Though not specifically limited, the support substrate 11 is preferably formed by means of an injection molding method, and the light transmission layer 12 is preferably formed by means of a spin coating method. That is, after the support substrate 11 is manufactured by means of the injection molding method, the light transmission layer 12 is directly formed on the surface, where the pits 11a are formed, by means of the spin coating method. This allows the optical recording medium 10 to be manufactured, without using a vacuum process with a sputtering device or the like. Accordingly, the manufacturing cost can be drastically reduced and the production efficiency can be drastically increased.

The invention is not limited to the embodiment described above but may include various changes and modifications within the scope of the invention as hereinafter claimed and such changes and modifications are needless to say intended to be within the scope thereof.

For example, though the next-generation type optical recording medium, to which the invention is applied, has been described in the above-described embodiment, the invention is not limited thereto. For example, the invention can be applied to other kinds of optical recording mediums, such as DVD type optical recording mediums.

What is claimed is:

1. An optical recording medium comprising:
   a support substrate having information recorded thereon; and
   a light transmission layer that is provided so as to come in contact with the support substrate,
   wherein an extinction coefficient of the support substrate and an extinction coefficient of the light transmission layer is different, and when a refractive index of the support substrate and a refractive index of the light transmission layer with respect to light having a wavelength of 405 nm are $n_{11}$ and $n_{12}$, respectively, and a difference between the extinction coefficient of the support substrate and the extinction coefficient of the light transmission layer with respect to light having a wavelength of 405 nm is k, the following equation is satisfied:

$$0.03 \leq \frac{((n_{11} - n_{12})^2 + k^2)}{((n_{11} + n_{12})^2 + k^2))}.$$

2. The optical recording medium according to claim 1, wherein a refractive index of the support substrate and the refractive index of the light transmission layer are also different.

3. The optical recording medium according to claim 1, wherein a plurality of pits are formed on the support substrate to be arranged in a spiral shape or a concentric shape.

4. A method of manufacturing an optical recording medium comprising:
   producing a support substrate having information recorded thereon by means of an injection molding method; and
   directly forming a light transmission layer, of which an extinction coefficient is different from that of the support substrate, on a surface of the support substrate by means of a spin coating method,
   wherein, when a refractive index of the support substrate and a refractive index of the light transmission layer with respect to light having a wavelength of 405 nm are $n_{11}$ and $n_{12}$, respectively, and a difference between an extinction coefficient of the support substrate and the extinction coefficient of the light transmission layer with respect to light having a wavelength of 405 nm is k, the following equation is satisfied:

$$0.03 \leq \frac{((n_{11} - n_{12})^2 + k^2)}{((n_{11} + n_{12})^2 + k^2))}.$$

5. The manufacturing method according to claim 4, wherein a refractive index of the support substrate and a refractive index of the light transmission layer are also different.

6. The manufacturing method according to claim 4, wherein the directly forming a light transmission layer includes forming the light transmission layer with the extinction coefficient such that a difference between an extinction coefficient of the support substrate and the extinction coefficient of the light transmission layer is at least 0.51.

7. The manufacturing method according to claim 4, wherein the directly forming a light transmission layer includes forming the light transmission layer with the refractive index such that a difference between a refractive index of the support substrate and the refractive index of the light transmission layer is at least 0.61.

8. The optical recording medium according to claim 1, wherein the difference between the extinction coefficient of the support substrate and the extinction coefficient of the light transmission layer is at least 0.51.

9. The optical recording medium according to claim 1, wherein the difference between the refractive index of the support substrate and the refractive index of the light transmission layer is at least 0.61.

* * * * *